Oct. 29, 1929.   J. H. O'NEILL   1,733,467
AIR SPRING
Filed July 29, 1924
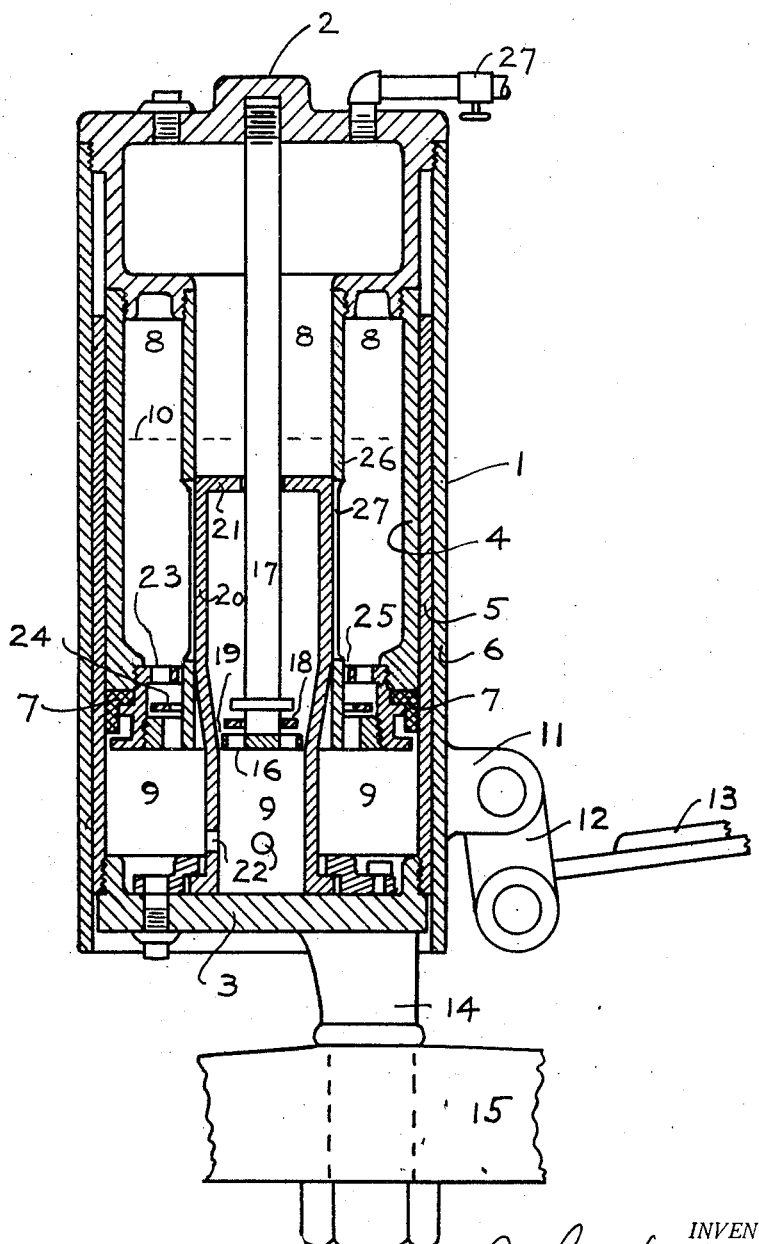
INVENTOR.
John Hugh O'Neill Patented Oct. 29, 1929

1,733,467

UNITED STATES PATENT OFFICE

JOHN HUGH O'NEILL, OF SPRINGFIELD, MISSOURI

AIR SPRING

Application filed July 29, 1924. Serial No. 728,895.

My invention relates to improvements in fluid pressure devices commonly called air springs in which an elastic gaseous fluid is the resilient element and a nonelastic liquid fluid is used to dampen the oscillation of the spring and to form a liquid seal over the sliding joint between the telescoping members which form the chamber containing the two kinds of fluid referred to.

My invention further relates to means for dampening the natural oscillations of the air springs by retarding the return of the spring members to normal position by means of structures forming asymmetric passages for the liquid fluid which allow comparatively free movement of the spring in compression or expansion from the normal or central position but retard the return movement from either compression or extension to the central position. Such liquid fluid will be referred to hereafter as oil.

My invention consists of constructions, combinations and arrangements applied to air springs and spring return motion retarding devices, by which the superior resilient quality of air over the common steel spring is utilized in an advantageous and convenient manner.

The object of my invention is to provide a fluid pressure device adapted for use as a spring which may be used in any relation where two bodies are so associated that resilient movement is desirable, and especially where one or the other of the bodies is subject to sudden movements, vibrations, or shocks which it is undesirable to have transmitted to the other of said bodies.

A further object is to provide structures by means of which oil passes freely through passages during the free moving extension or compression of the air spring away from the central position and by which the oil is forced through automatically produced constrictions in the passages during the return of the air spring, from either extension or compression, to the central position, for the purpose of dampening the oscillation of the air spring.

I attain my objects by mechanisms such as those disclosed in the accompanying description and drawing, in which the drawing illustrates a sectional elevation of an air spring.

Referring to the drawing 1 is an air spring composed of two members, an upper member 2 and a lower member 3. The upper member 2 and lower member 3 are provided with telescoping tubes. The smaller or inner tube 4 is attached to the upper member 2 and the larger or outer tube 5 is attached to the lower member 3.

An outer tube 6 is preferably provided as a dust guard and as a guide for tube 5 and is secured to upper member 2.

The tubes 4 and 5 are hermetically closed at the outer ends and the inner tube 4 is provided at the inner end with peripheral packing 7 adapted to form a fluid tight joint with tube 5.

The telescoping tubes 4 and 5 form a chamber of variable volumetric capacity. The fluid within the chamber consists of air in the upper portion 8 and of oil in the lower portion 9. Preferably the lower portion 9 is filled with oil to approximately the level of the dotted line 10 when the air spring is at rest and has been supplied with compressed air of such pressure as to cause the air spring to extend to the central or normal position, which is the position shown.

Any suitable form of connecting or bearing means for attaching the air spring to the sprung load may be used such as the lug 11, shackle 12 and steel spring 13. The connection to the unsprung load is by any suitable means, such as the bolt 14 to the axle 15.

In order to dampen or restrict the return oscillations of the air spring pistons with automatic valves working in oil in cylinders are provided. The pistons are connected by piston rods to the upper member 2 and the cylinders are attached to the lower member 3 in the preferred construction.

The piston 16 is attached by piston rod 17 to upper member 2, and carries an automatic valve 18 which lifts from its seat during motion of the air spring 1 in compression and closes on its seat during the reverse movement in extension. The drawing shows the air spring 1 in middle or normal position in which the clearance space 19 between the wall of the cylinder 20 and the piston 16 is small.

This clearance space 19 continues small throughout the lower portion of the cylinder 20 through which the piston 16 travels between normal and compressed positions.

The piston 16 is effective in retarding the return of the air spring 1 from compressed position to normal by means of the relatively smaller passage for oil, which is formed during this portion of the stroke, from the upper to the lower side of the piston 16. During this portion of the stroke the valve 18 is closed.

Extension of the air spring 1 from normal to extended position is not resisted by the piston 16 because of the larger area of clearance space 19 in the enlarged bore of the upper part of the cylinder 20, which affords a relatively free passage for oil.

Cylinder 20 is closed by head 21 through which piston rod 17 slidably passes. Cylinder 20 is attached to lower member 3. Holes 22 are provided in the wall of cylinder 20 for the displacement of oil by the piston rod 17.

The piston 23, which retards the return of air spring 1 from extended to normal position, is carried on tube 4 attached to upper member 2 and is provided with an automatic valve 24 which opens during the extension movement of air spring 1 and closes during the opposite or compression movement. The retarding effect is produced by the passage of oil from below to above piston 23 through the restricted orifice which is clearance space 25, the valve 24 being closed during this movement. Clearance space 25 is between piston 23 and the outer wall of tube 26.

Tube 26 is attached to upper member 2 and is slotted at 27 so that when tube 26 telescopes over cylinder 20 during the movement of air spring 1 from normal position to compressed position, a free passage for oil will be afforded from the lower portion 9 into the upper portion 8 through the slots 27 which will then register with the smaller diameter of cylinder 20. In effect, tube 26 forms a part of piston 23. Thus piston 23 will not retard the motion of air spring 1 while it is moving into compressed position from normal.

Air under pressure is introduced in desired quantity through valve 27.

In operation the air spring 1 affords an elastic cushion which moves freely into either compression or extension as need be, and the return to normal position is accomplished at a retarded rate through the action of the oil in passing through the asymmetric passages produced by the respective opening and closing of the automatic valves in the two oscillation retarding pistons 16 and 23. The retard of the return from extension is very useful, for it causes a delay in the fall of the sprung load when a depression in the road surface is passed over by the vehicle.

While I have herein fully shown and described, and have pointed out in the appended claims certain novel features of construction, arrangement, and operation which characterize my invention, it will be understood by those skilled in the art that various omissions, substitutions, and changes in the form, proportions, sizes and details of the device and of its operation, may be made without departing from my invention.

I claim:

1. In an air spring, upper and lower telescopic tubes with outer ends closed and forming a chamber of variable volumetric capacity, elastic and non-elastic fluids within said chamber, two pistons and respective cylinders, each piston being attached to an opposite telescopic tube from the telescopic tube to which its respective cylinder is attached, an automatic valve on one of said pistons adapted to close during the movement in compression of said air spring, an automatic valve on the other of said pistons adapted to close during the movement in extension of said air spring, said cylinders being provided with bores relatively smaller where traversed by said respective pistons in active condition with respective automatic valves closed by the flow of oil during the return of said air spring respectively from extended to normal and compressed to normal positions.

2. In an air spring, upper and lower telescoping tubes with outer ends closed and forming a chamber of variable volumetric capacity, elastic and non-elastic fluids within said chamber, a piston attached to one of said telescopic tubes and a respective cylinder attached to the other of said telescopic tubes, an automatic valve on said piston, said automatic valve closing when said air spring moves in compression, said cylinder being provided with a bore relatively smaller where traversed by said piston during the motion of said air spring between extended and normal position.

3. In an air spring, upper and lower telescoping tubes with outer ends closed and forming a chamber of variable volumetric capacity, elastic and non-elastic fluids within said chamber, a piston attached to one of said telescopic tubes, and a respective cylinder attached to the other of said telescopic tubes, an automatic valve on said piston, said automatic valve closing when said air spring moves in extension, said cylinder being provided with a bore relatively smaller where traversed by said piston during the motion of said air spring between compressed and normal position.

JOHN HUGH O'NEILL.